(12) United States Patent
Sundquist et al.

(10) Patent No.: US 12,307,689 B2
(45) Date of Patent: May 20, 2025

(54) VIRTUAL REALITY TRANSLATION OF LOCATION BASED ON STARTING POSITION OF SPORTS IMPLEMENT

(71) Applicant: Sports Virtual Training Systems Inc., Colorado Springs, CO (US)

(72) Inventors: Ted Sundquist, Parker, CO (US); William Jacob Harris, Littleton, CO (US); Benjamin J. Kwitek, Canon City, CO (US)

(73) Assignee: Sports Virtual Training Systems Inc., Colorado Springs, CO (US)

( * ) Notice: Subject to any disclaimer, the term of this patent is extended or adjusted under 35 U.S.C. 154(b) by 438 days.

(21) Appl. No.: 17/659,137

(22) Filed: Apr. 13, 2022

(65) Prior Publication Data

US 2022/0335627 A1 Oct. 20, 2022

Related U.S. Application Data

(60) Provisional application No. 63/174,925, filed on Apr. 14, 2021.

(51) Int. Cl.
*G06T 7/292* (2017.01)
*G06T 7/246* (2017.01)
*G06T 7/73* (2017.01)

(52) U.S. Cl.
CPC ............. *G06T 7/292* (2017.01); *G06T 7/246* (2017.01); *G06T 7/73* (2017.01); *G06T 2207/30224* (2013.01)

(58) Field of Classification Search
CPC .......... G06T 2207/30221; G06T 7/292; G06T 2207/30224; G06T 7/246–251; G06T 7/73–75

See application file for complete search history.

(56) References Cited

U.S. PATENT DOCUMENTS

| | | | |
|---|---|---|---|
| 5,398,936 | A | 3/1995 | Kluttz et al. |
| 5,882,204 | A | 3/1999 | Tannazo et al. |
| 6,322,455 | B1 | 11/2001 | Howey |
| 7,457,439 | B1 | 11/2008 | Madsen et al. |
| 7,980,998 | B2 | 1/2011 | Shemesh et al. |
| 8,248,462 | B2 | 8/2012 | Peterka et al. |
| 8,512,043 | B2 | 8/2013 | Choquet |
| 8,527,625 | B2 | 9/2013 | Polbier et al. |
| 8,597,095 | B2 | 12/2013 | Crowley et al. |
| 8,615,383 | B2 | 12/2013 | Dobbins et al. |

(Continued)

FOREIGN PATENT DOCUMENTS

CA 3042375 C * 2/2021 ............. A63B 24/00

OTHER PUBLICATIONS

EON Sports VR, Sidekiq QB Challenge Release, May 11, 2015, https://www.youtube.com/watch?v=ZV4jR07fNHE (Year: 2015).*

(Continued)

*Primary Examiner* — Utpal D Shah
*Assistant Examiner* — Jack Peter Kraynak
(74) *Attorney, Agent, or Firm* — WELSH FLAXMAN & GITLER LLC

(57) ABSTRACT

A system for simulating sports includes a motion capture tracking system linked to a computer for monitoring movement of a ball and a ball holding device having a predefined geospatial location that is monitored and identified by the motion capture tracking system that is linked to the computer.

12 Claims, 13 Drawing Sheets

(56) References Cited

U.S. PATENT DOCUMENTS

| | | | |
|---|---|---|---|
| 8,622,832 B2 | 1/2014 | Marty et al. | |
| 8,690,655 B2 | 4/2014 | Meyer et al. | |
| 8,702,516 B2 | 4/2014 | Bentley et al. | |
| 2003/0203757 A1 | 10/2003 | Chanda et al. | |
| 2004/0266535 A1 | 12/2004 | Reeves | |
| 2006/0017654 A1 | 1/2006 | Romo | |
| 2006/0116185 A1 | 6/2006 | Krull | |
| 2006/0189386 A1 | 8/2006 | Rosenberg | |
| 2006/0281061 A1 | 12/2006 | Hightower et al. | |
| 2008/0220941 A1 | 9/2008 | Shaw et al. | |
| 2009/0091583 A1 | 4/2009 | McCoy | |
| 2011/0218065 A1* | 9/2011 | Cavallaro | A63B 41/00 473/603 |
| 2012/0262558 A1 | 10/2012 | Boger et al. | |
| 2013/0189656 A1 | 7/2013 | Zboray et al. | |
| 2013/0317634 A1 | 11/2013 | French et al. | |
| 2013/0345839 A1 | 12/2013 | Stephens et al. | |
| 2014/0045154 A1 | 2/2014 | Hook et al. | |
| 2014/0080638 A1* | 3/2014 | Feng | A63B 24/0006 473/439 |
| 2014/0120960 A1* | 5/2014 | Hohteri | G01S 5/0036 455/466 |
| 2014/0200059 A1 | 7/2014 | Thomas et al. | |
| 2014/0212004 A1* | 7/2014 | Suk | G01C 11/02 382/107 |
| 2016/0001136 A1* | 1/2016 | King | A63B 41/00 320/108 |
| 2017/0046967 A1* | 2/2017 | Sundquist | A63B 69/00 |
| 2017/0216683 A1* | 8/2017 | Fang | F21V 15/01 |
| 2018/0339215 A1* | 11/2018 | Hu | G09B 19/0038 |
| 2019/0126125 A1* | 5/2019 | Kudirka | G06T 19/006 |
| 2021/0031083 A1* | 2/2021 | Stone | A63B 71/0619 |

OTHER PUBLICATIONS

ZV-TEE, ZV-TEE LED Infused Batting Tee, Aug. 4, 2020, https://web.archive.org/web/20200804083432/https://www.zvtee.com/products/zv-tee (Year: 2020).*

Eon Sports. Sidekiq Introduction Virtual Reality Football Training. Apr. 12, 2013 [retrieved on May 11, 2015]. Retrieved from the Internet ,URL:https://youtube.com/watch?v= IFzhiSSXCA. entire document.

Reilly, Eon Reality Sports Football Simulator Sneak Preview. Jun. 7, 2013 [retrieved on May 11, 2015]. Retrieved from the Internet:https://www.youtube.com/watch?v=O-MukKsQtNg, entire document.

* cited by examiner

VIRTUAL REALITY TRANSLATION OF LOCATION BASED ON STARTING POSITION OF SPORTS IMPLEMENT

REFERENCE TO RELATED APPLICATIONS

The application claims the benefit of U.S. Provisional Patent Application Ser. No. 63/174,925, entitled "Virtual Reality Translation of Location Based on Starting Position of Sports Implement," filed Apr. 14, 2021, which is incorporated herein by reference.

BACKGROUND OF THE INVENTION

Field of the Invention

The invention relates to articles specifically adapted for use in conjunction with computer-based tracking systems.

Description of Related Art

Most sports are played with implements or objects that the players manipulate to achieve desired outcomes. Often, these implements are balls. Balls are used in numerous sports including football (American), soccer, basketball, baseball, tennis, volleyball, and others.

American football is perhaps the most popular major spectator sport in the United States. Each year from late summer through early winter, millions of Americans watch games played by their favorite teams. The National Football League (NFL), along with college and high school teams, contribute significantly to American culture. One only needs to examine the Super Bowl and its astounding numbers regarding audience and impact as evidence.

Football is a game that many teams only play competitively once per week. The NFL season is only 16-21 weeks long. Having said that, the game is known for its intensity. In recent years, there has been increased focus on injuries that are sustained while practicing or playing football. These injuries harm the players, teams, fans, and society at large. While many companies are addressing safety technologies for the players, perhaps one of the best ways to increase player safety is through computer simulation—especially Virtual Reality (VR) or Augmented Reality (AR) systems. Computer simulation allows players to experience millions of scenarios and learn how to avoid injury.

One of the challenges with existing VR or AR systems for sports games revolves around the ball. Having a fake ball or one that is tethered with wires is less than ideal. Quarterbacks want to practice using a real football so the feel and effects closely parallel reality. Although throwing an actual football in a room or enclosed environment can provide the tactile experience desired by the quarterback, the next challenge is determining where the pass would actually go. For example, if a quarterback throws a ball and after 10 or 15 feet it hits a net, how can the player and other stakeholders know where that ball would have actually traveled in a real game? This level of detail and data is essential for a realistic training experience.

Until now, most VR simulators have not utilized a real football. Applicant has created a VR system that utilizes an actual football (which is disclosed in U.S. Patent Application Publication No. 2017/0046967, entitled "VIRTUAL TEAM SPORT TRAINER", which is incorporated herein by reference). One of the challenges for a VR game or simulation has been the starting point or position for the actual football in the physical world.

SUMMARY

In one aspect a system for simulating sports includes a motion capture tracking system linked to a computer for monitoring movement of a ball and a ball holding device having a predefined geospatial location that is monitored and identified by the motion capture tracking system that is linked to the computer.

In some embodiments the motion capture tracking system includes a plurality of IR (Infrared) motion tracking cameras and the ball holding device has tracking elements allowing for immediate tracking thereof.

In some embodiments the tracking elements of the ball holding device are IR LEDs that may be identified by the motion capture tracking system.

In some embodiments, upon repositioning of the ball holding device, the motion capture tracking system redraws an animated field based on a new perceived location.

In some embodiments the system includes a head mounted display device.

In some embodiments the ball holding device includes a securing component to securely hold the ball in place on the ball holding device.

In some embodiments the ball is an actively tracked ball.

In some embodiments the ball comprises a ball body and light system.

In some embodiments the light system includes an infrared LED control board, a battery, a charging chip, a magnetic charging cable adapter, a set of IR LEDs, and wiring.

In some embodiments the IR LEDs are integrated into the ball body.

In some embodiments the ball holding device also includes a charging module and conductive elements to provide a power source for the football.

Other objects and advantages of the present invention will become apparent from the following detailed description when viewed in conjunction with the accompanying drawings, which set forth certain embodiments of the invention.

DETAILED DESCRIPTION

Figure 1A:
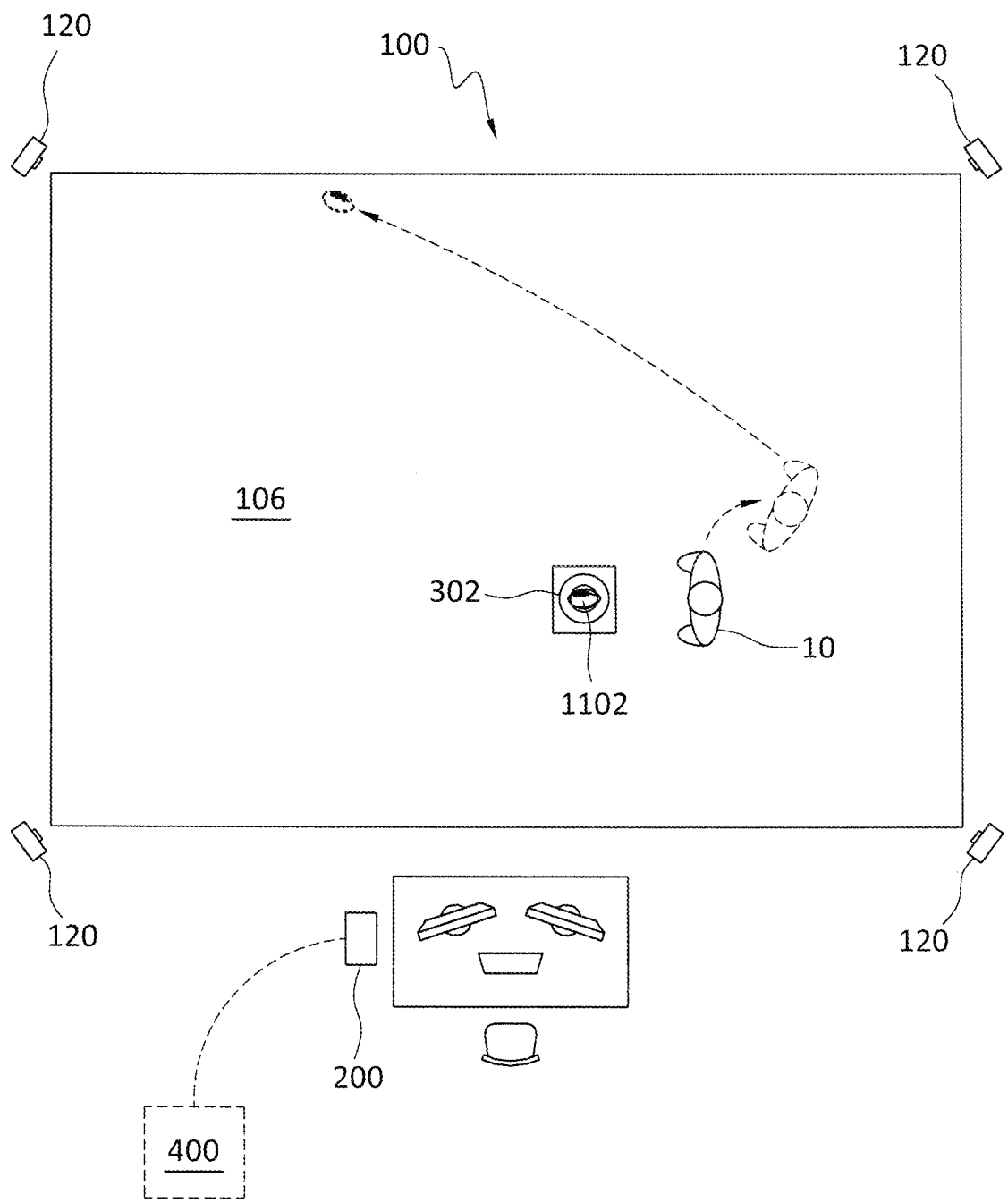
FIG. 1A is a plan view of the physical practice field as the quarterback (QB) makes the play as diagrammed in FIG. 1B. The football is on the ball holding device. The quarterback rolls out to his right and throws the ball. His movement and the thrown ball are in dashed lines.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as a basis for teaching one skilled in the art how to make and/or use the invention.

Referring to the various figures, a system for simulating sports 100 is disclosed. In accordance with a disclosed embodiment, the system for simulating sports 100 is specifically adapted for use in conjunction with the simulation of a football game. However, it is appreciated the system for simulating sports 100 may be adapted for use in conjunction with various other sports.

The system for simulating sports 100 is a team sport trainer providing psychological and physiological training similar to repetitions against a scout team. The system for simulating sports 100 is an advancement upon Applicant's own system for simulating sports as disclosed in U.S. Patent Application Publication No. 2017/0046967, entitled "VIRTUAL TEAM SPORT TRAINER," which is incorporated herein by reference.

The system for simulating sports 100 provides training superior to repetitions against a scout team by more accurately simulating the most probable actions of actual players on an opponent team 12. The system for simulating sports 100 provides first person perspective and feedback intended to hone reactive instincts between mind-body connections as a result of seeing a visual stimulus and reacting with a physical response to the stimulus. According to an embodiment, the system for simulating sports 100 leverages advances in computing speed, pipelined processing architectures, and immersive display devices.

Displaying the reaction of a simulated opponent team is helpful to a player 10 (especially for positions responsible for pre-snap calls such as the quarterback, center, and defensive backfield positions). For a quarterback, for example, the ability to throw the real football 1102 to the simulated intended target 14 provides the player 10 a much clearer indication of their performance and makes clear necessary adjustments to achieve a successful play against the simulated opponent team 12. According to embodiments, the system for simulating sports 100 display to the player 10 the release of the football 1102 through a head mounted display device 104. The system for simulating sports 100 also detects the real football trajectory and responsively animates a simulated pass according to velocity and angle of release of the real football 1102. The animated pass can then be displayed to the player 10 via the head mounted display device 104, who can watch the path of the virtual football to the simulated receiver 14, along with simulated opponents 12 reaction to the throw.

According to an embodiment, the system for simulating sports 100 detects player gaze direction (e.g., corresponding to the direction in which the player's head points) relative to the simulation and the animated opponent defensive backs can adjust their coverage in real time responsive to the gaze direction, thus simulating the tendency for a real opponent team to react to "staring down" the quarterback's intended receiver. A method for training a player of a team sport therefore includes the steps of providing, to the player 10, an immersive computer head mounted display device 104 operatively coupled to a computer 200; receiving, from a portion of a sensing circuit 104c integrated with the head mounted display device 104 and operatively coupled to the computer 200, a location and gaze direction of the player 10 relative to a physical practice field 106, the location and gaze direction collectively defining a perspective; and generating, with the computer 200, an animation including respective team and opponent team pre-play alignments that are displayed to the player 10 via the head mounted display device 104.

The animation is registered to the physical practice field 106. The animation includes pre-play alignments displayed to the player 10 via the immersive computer head mounted display device 104. A command from the player 10 to start play is received from the sensing circuit 104c. Responsive to the command to start play, at least one simulated team player 14 and at least one simulated opponent player 12 are animated to respectively execute a selected team play and a selected opponent play. While the player 10 executes real physical movements on the practice field 106 corresponding to the called team play, a first person view of the animation is output to the player 10 via the immersive computer head mounted display device 104 corresponding to a sequence of sensed perspectives (see, for example, FIGS. 1C and 2C). A non-transitory computer readable medium carries computer readable instructions configured to cause the computer 200 to execute the method described above.

Figure 7:
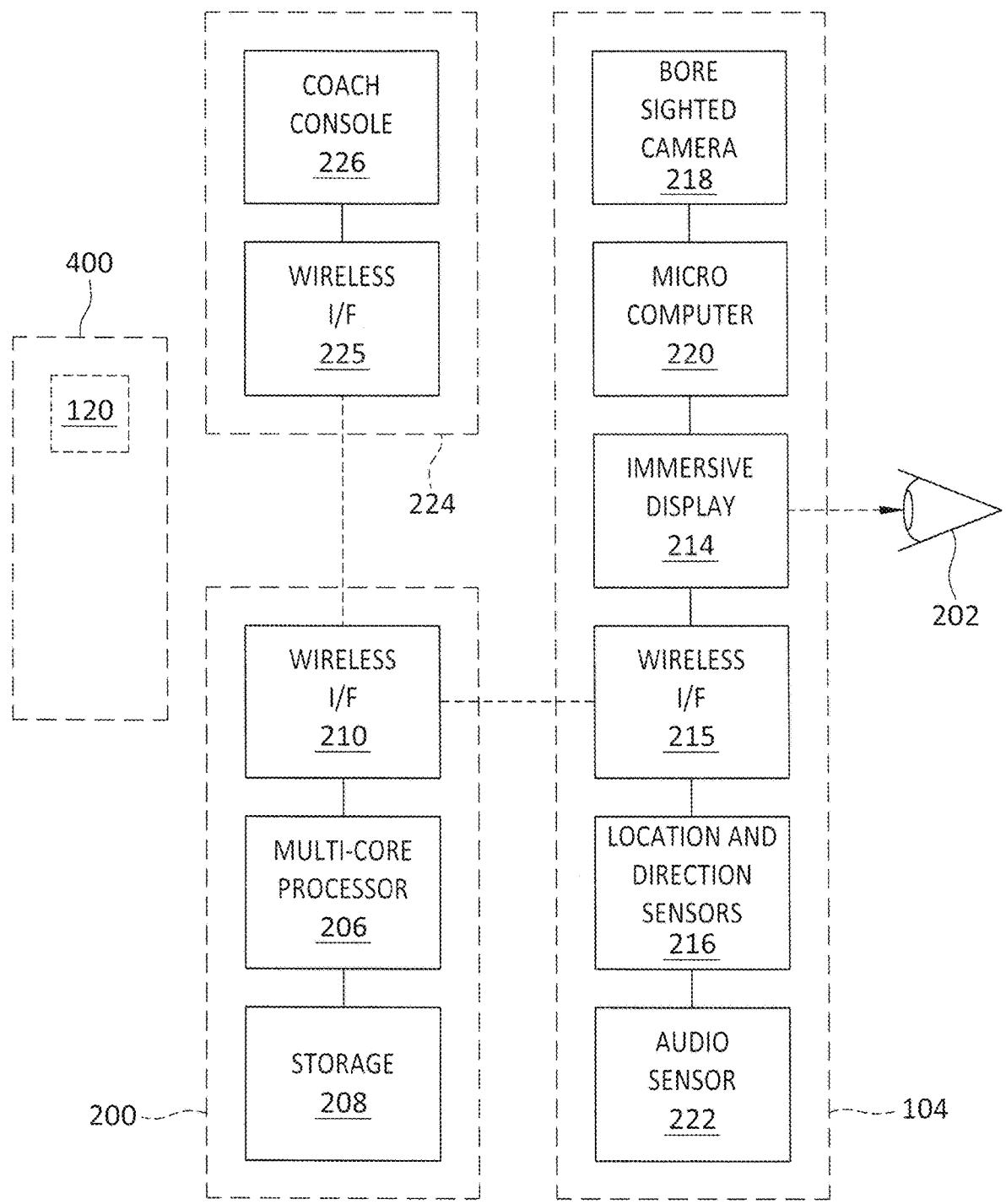
FIG. 7 is a schematic of the hardware used by the present system for simulating sports.

FIG. 7 is a block diagram showing a hardware arrangement for presenting an immersive team sport training environment to a player 10, according to the system for simulating sports 100. The system for simulating sports 100 includes computer-executable instructions, corresponding to software modules described below, carried by a non-transitory computer-readable medium. The system for simulating sports 100 includes a computer 200 configured to execute at least a portion of the computer-executable instructions.

In accordance with a disclosed embodiment, the computer 200 includes a multi-core processor 206, computer readable non-transitory media storage 208, and a wireless interface 210. The computer 200 is configured to execute at least a portion of the computer-readable instructions described herein. A head mounted display device 104 includes an immersive display 214 configured to output the first person view to the player's eye 202. The head mounted display device 104 includes location and detection sensors 216 (or a real time location tracker and a real time gaze tracker). The head mounted display device 104 further includes a video camera 218 bore-sited to the occluded head-mounted display 104.

The head mounted display device 104 includes a microcomputer 220 including an image processor. The microcomputer 220 is configured to execute computer instructions corresponding to a presentation module 204 of the software (described below).

It is important for gaze direction to be properly registered to the player's head movements. A perceptible lag in panning of the immersive image relative to the real direction of the player's head can be distracting and/or can induce motion sickness. In one embodiment, panning of the animated image is performed locally in the head mounted display device 104. The local micro-computer 220 is configured as an image processor that receives angular information from the location and direction sensors 216 and selects a portion of the image from the animation module corresponding to the current gaze direction.

The head mounted display device 104 further includes an audio sensor 222 configured to receive audible play calls made by the player. The audio sensor 222 includes a microphone and an analog-to-digital converter configured to convert the audible play calls to digital data for output to the computer 200 via wireless interfaces 215.

The system for simulating sports 100 further includes a coach's controller 224 configured to execute a coach interface. The coach's controller 224 includes a wireless interface 225 configured to communicate with a wireless interface 210 in the computer 200 including a multi-core processor 206. The coach's controller 224 includes a coach console 226 configured to present an opponent play selection interface and team play selection interface.

In addition, and as will be appreciated based upon the following disclosure, the system also includes a motion capture tracking system 400 that is linked to the computer 200 for monitoring movement of the football 1102 and other elements of the system.

As explained above, the position of the football 1102 is continually monitored via the system for simulating sports 100, in particular, the motion capture tracking system 400, in accordance with the present invention. The football is of the shape of a prolate spheroid. Once airborne, the location of the football 1102 is tracked by the motion capture tracking system 400, which includes high-definition cameras 120 and the accompanying software that provides a realistic simulation for the user. The starting position of the football 1102 is a critical factor in the overall simulation as this allows for effective use of the physical space for simulation. The football's initial location presents at least three important considerations. One, the football 1102 needs to be at approximately the right height when the player 10 (in the disclosed embodiment it is the quarterback) initially makes contact to simulate an actual football play. For example, if the football 1102 were on the ground or at six feet, the quarterback's perceptions and muscle memories would be adversely affected. Two, the initial location of the football sets the parameters of the field. In non-virtual football, the football 1102 is initially placed within the approximate center of the field (on the appropriate yard line). This placement gives room on both sides of the quarterback for running plays. As the game progresses this initial placement will vary between "hash marks" on the field. Three, the size of the actual physical practice field 106 for the proposed VR simulation is often smaller than an actual field.

Figure 1B:
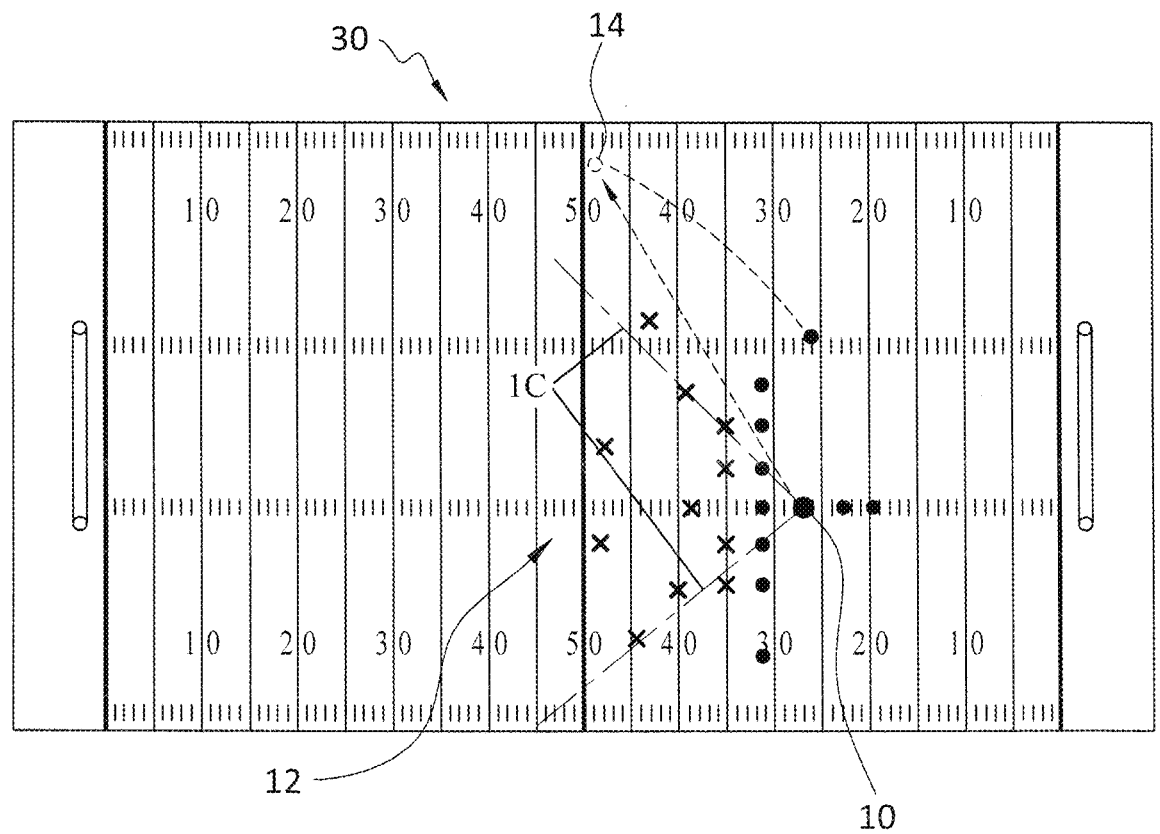
FIG. 1B is schematic of a gridiron with the first play. The quarterback is at the left hash mark on the 26 yard line and throws a pass to the wide receiver at the 49 yard line. The center lines (marked 1C) coming from the quarterback are to show his field of view and is what is shown in FIG. 1C.
Figure 1C:
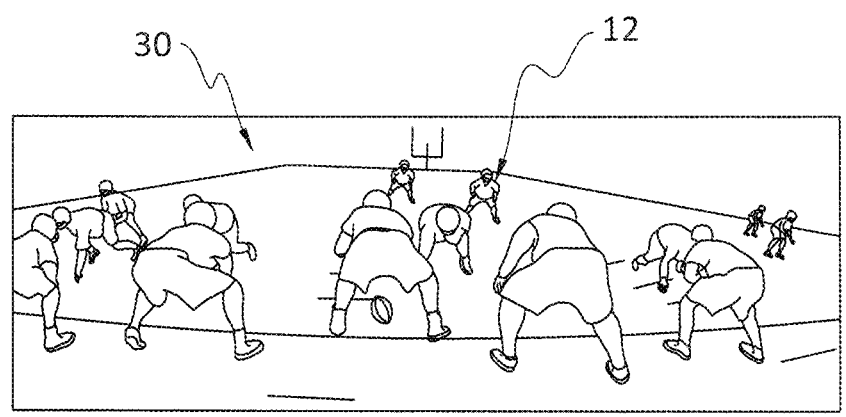
FIG. 1C is a view of what the quarterback sees in his headset as the ball is being snapped as the play diagrammed in FIG. 1B starts.
Figure 2A:
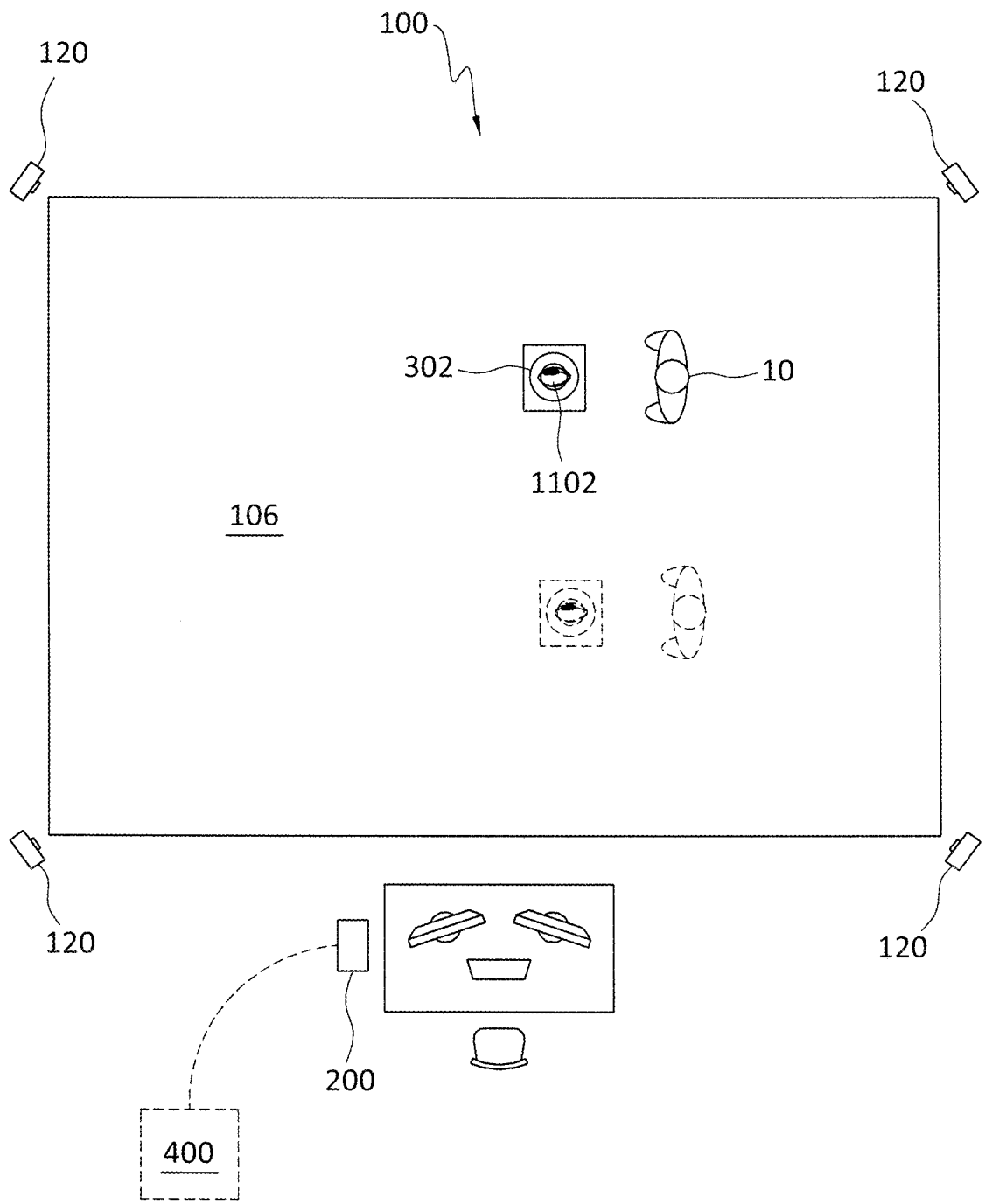
FIG. 2A is a plan view of the physical practice field with the play setup of FIG. 2B. In this view, the ball holding device with the football has been moved farther to the right so that the quarterback has more room to move to the left on the practice field. The old locations of the ball holding device and quarterback are in dashed lines.
Figure 2B:
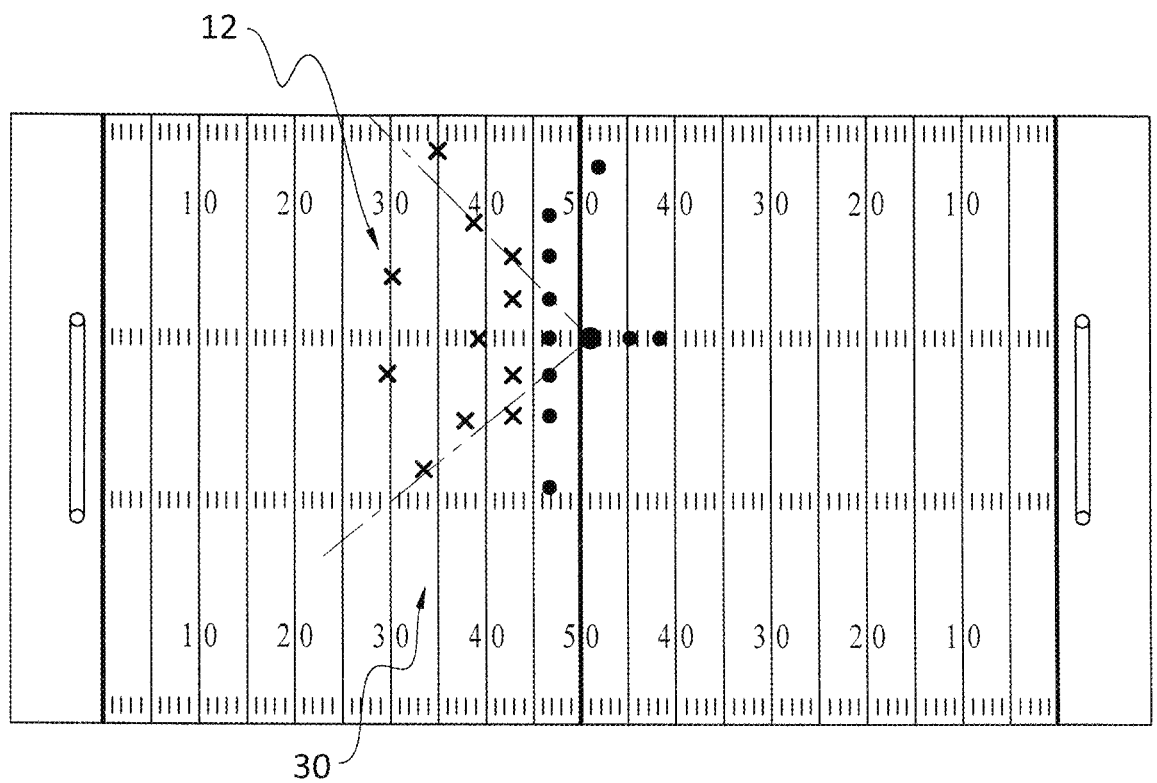
FIG. 2B is a diagram of the second play. The previous play was to the 49 yard line, so the ball is placed on the right middle hash mark on the 49 yard line.
Figure 2C:
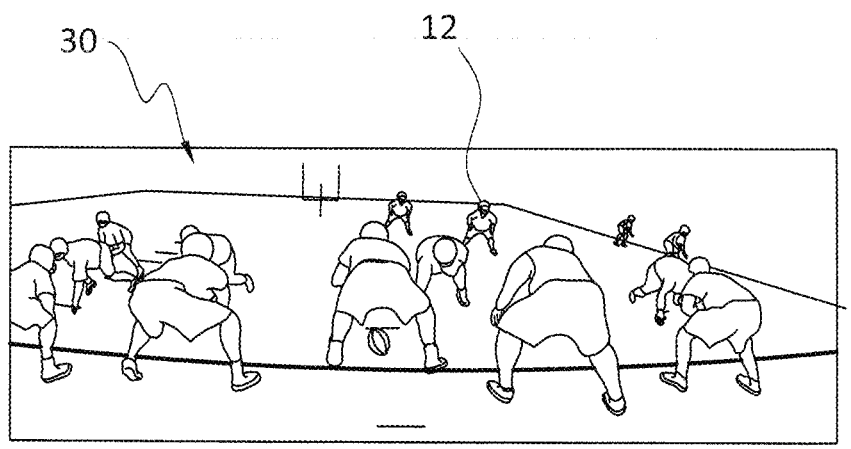
FIG. 2C is a view of what the quarterback sees in his headset as the ball is being snapped at the line of scrimmage from the FIG. 2B diagram.

Having the ability to move around the physical practice field 106 while playing the simulation is essential. Consequently, the initial placement or position of the football 1102 helps set the size and location details within the simulated game. So, if space is limited, the starting position of the football 1102 could be moved to maximize accurate movement for the player 10 within the space in the VR environment. For example, and with reference to FIGS. 1A-1C and 2A-2C, FIG. 1A shows the physical practice field 106 as the player 10 (operating as the quarterback) makes the play as diagrammed in FIG. 1B. The football 1102 is on the ball holding device 302. The quarterback 10 rolls out to his right and throws the ball. His movement and the thrown football 1102 are in dashed lines. FIG. 1B is a schematic of a gridiron with the first play. The quarterback 10 is at the left hash mark on the 26 yard line, and throws a pass to the wide receiver at the 49 yard line. The center lines (marked 1C) coming from the quarterback 10 are to show his field of view and is what is shown in FIG. 1B. FIG. 1C is a view of what the quarterback 10 sees in his headset 104 as the football 1102 is being snapped as the play diagrammed in FIG. 1B starts. FIG. 2A is a plan view of the physical practice field 106 with the play setup of FIG. 2B. In this view, the ball holding device 302 with the football 1102 has been moved farther to the right so that the quarterback has more room to move to the left on the practice field 106. The old location of the ball holding device 302 and quarterback 10 is in dashed lines. FIG. 2B is a diagram of the second play. The previous play was to the 49 yard line, so the football 1102 is placed on the right middle hash mark on the 49 yard line. FIG. 2C is a view of what the quarterback sees in his headset 104 as the ball is being snapped at the line of scrimmage from the FIG. 2B diagram.

The present invention utilizes a ball holding device 302 in the form of a cone or other holding device to set the initial position. It should be noted that other shapes and devices for the ball holding device may be employed without departing from the spirit of the invention. The ball holding device 302 may also be used to place or hold the football 1102.

In accordance with a disclosed embodiment, the ball holding device 302 has a predefined geospatial location (x, y and z Cartesian coordinates) that is monitored and identified by the motion capture tracking system 400 that is linked to the computer 200 discussed above. In accordance with a disclosed embodiment, the OptiTrack™ motion capture tracking system is used and the specifications for the cameras 120 of the OptiTrack™ motion capture tracking system 400 are implemented. However, it is appreciated the cameras can be any type of device which can capture and convert to digital signal to the horizontal and vertical locations of the ball holding device 302 within the view of the IR (Infrared) motion tracking camera 120. The ball holding device 302 has tracking elements 304 allowing for immediate tracking thereof, for example, IR LEDs that may be identified by the motion capture tracking system 400. While IR LEDs 304 are disclosed in accordance with this embodiment, the tracking elements could be other LEDs (Light Emitting Diodes), RFID (Radio-frequency Identification), NFC (Near-field Communication), GPS (Global Position System), or other location tracking technologies such as triangulation.

As a result of the motion capture tracking system 400 identifying the starting location of the football 1102, the ball holding device 302 may be repositioned where desired. This repositioning automatically causes the software to redraw the animate field 30 based on the new perceived location. This allows for new plays and the optimal use of the physical practice field 106 space within the training or entertainment venue.

This geospatial creation is accomplished with various calculations and formulas—including algorithms to maximize beneficial effects in the simulation. Once a play has commenced, the virtual location of the player is always started relative to that of the ball holding device 302. The offset of the physical location of the ball holding device 302 at the start of the play serves as a fiduciary location to provide the necessary motion tracking offsets such that virtual translation of motion occurs in a meaningful way. By allowing the user to manually position the ball holding device 302 before starting a play, the user can optimize the use of the physical area of the motion capture equipment without having to recalibrate or reset the origin for motion tracking. This also provides an intuitive method for the user to adjust the simulation's origin for motion tracking of the player. The software may also employ machine learning techniques to create AI-inspired scenarios, histories, and the like.

The ball holding device 302 works seamlessly in conjunction with the football 1102, cameras 120, motion capture tracking system 400, computer 200, head mounted display device 104, and other equipment. It is also anticipated that multiple ball holding devices might be utilized as a way to provide complex simulations or other training options. The ball holding device 302 locations would be tracked, managed, and recorded in the present system 100.

Figure 6:
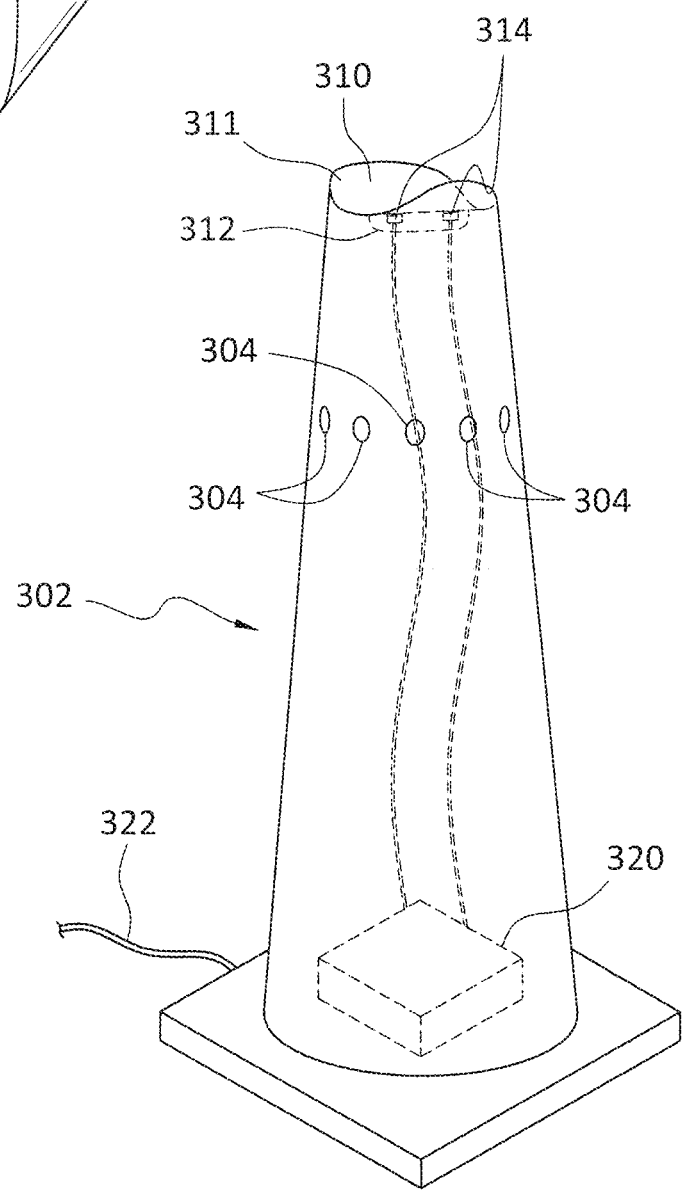
FIG. 6 is a perspective view of a ball holding device.

The ball holding device 302 desirably supports the football 1102 even when a user in not nearby to hold the football 1102 on the ball holding device 302. With reference to FIG. 6, the ball holding device 302 includes a securing component 310 to securely hold the football 1102 in place on the ball holding device 302. In accordance with one embodiment, the securing component 310 includes a broader point 311 on the ball holding device 302. In accordance with other embodiments, the securing component includes other physical constructs that would effectively cradle the ball within its home position.

The ball holding device 302 also includes a charging module 312 and conductive elements 314 to provide a power source for the football 1102, head mounted display device 104, or other required equipment. In this way, the ball holding device 302 is connected via wires to a power source 320. The ball holding device 302 may also be fitted with batteries or other technology for power storage.

Finally, the ball holding device 302 may have cables 322 connecting to the computer 200 or other processing machine. This connection may also be wireless and utilize Wi-Fi, Bluetooth, or other communication methods to transmit data.

Figure 14:
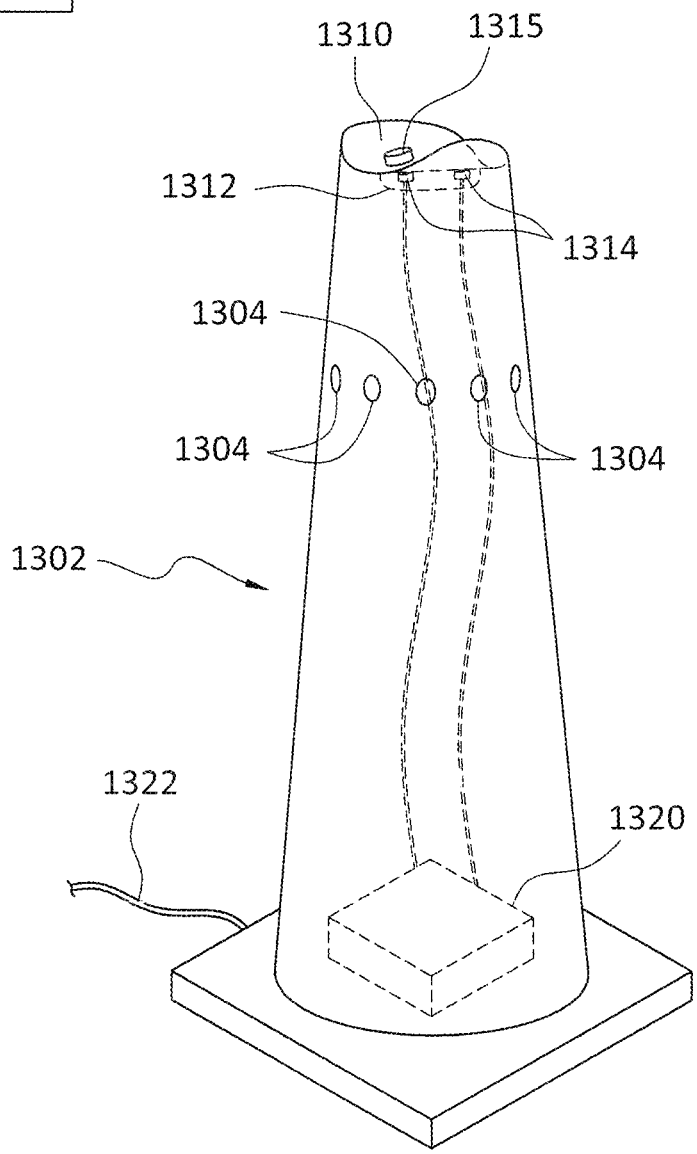
FIG. 14 is a ball holding device in accordance with an alternate embodiment.

In accordance with another embodiment, as shown with reference to FIG. 14, the ball holding device 1302 would not necessarily be the focus of the motion capture tracking system 1400, but rather the football 1102 would be the focus of the motion capture tracking system 1400 used to identify the location of a starting point for play. The interaction between the football 1102 and the ball holding device 1302 identifies when the motion capture tracking system 1400 should focus upon the football 1102 to identify the football location.

In accordance with either embodiment, but especially with the embodiment disclosed with reference to FIG. 14, a football 1102 such as that disclosed in Applicant's own U.S. Provisional Patent Application No. 63/132,759, entitled "COMPUTER TRACKABLE FOOTBALL, SYSTEM AND METHOD OF MANUFACTURING", which is incorporated herein by reference, is used. Briefly, and with reference to FIGS. 8 to 13, the actively tracked football 1102 comprises the football body 1114 and light system 1116. The light system 1116 includes a variety of electrical components integrated into the football body 1114 in a manner providing for functionality in accordance with the present invention, without altering the look, feel, or flight of the actively tracked football 1102. As will be disclosed below in more detail, the light system 1116 includes an infrared LED control board 1118, a battery 1120, a charging chip 1122, a magnetic charging cable adapter 1124, a set of IR LEDs 1112, and wiring 1128. As will be appreciated based upon the following disclosure, wiring 1128 is required to connect the various parts making up the light system 1116 of the present actively tracked football 1102. In accordance with a disclosed embodiment, the wiring is small gauge (28-32) magnet wire. The wire is thin enough to not present through (that is, be noticeable through) the skin 1132 of the football body 1114. The light system 1116, and its various components, can also be placed in a format utilizing the multiple separated areas of the ball's interior. These components may also take on varied physical shapes based on the fit inside the ball.

The football body 1114 is a conventional football and includes an inflatable bladder 1130 with a covering or skin 1132, for example, leather, synthetic leather, or other comparable material, secured over the inflatable bladder 1130. In accordance with a disclosed embodiment, the skin 1132 is composed of three layers, that is, an interior canvas layer, a central padding layer, and an exterior skin layer. The football body 1114 is the shape of a prolate spheroid. In accordance with the embodiment disclosed herein, the ball will have at least an outer layer, generally leather or faux leather, an inner canvas layer, and padding layer between the inner layer and the outer layer.

Considering now in detail the elements making up the light system 1116 of the present actively tracked football 1102, the control board 1118 is the OptiTrack™ provided circuit board loaded with their proprietary motion capture software. As with other components of the light system 1116, the control board 1118 is mounted upon a flat mounting base 1143 of a semi-flexible shell 1126 that is secured to the internal surface 1132i of the skin 1132 such that the control board 1118 is positioned between the skin 1132 and the bladder 1130.

The battery 1120 is a coin style slim lithium-ion rechargeable battery that is also mounted upon the flat mounting base 1143 of the shell 1126. The battery 1120 is connected to the control board 1118 via electrical wiring 1128 using known wiring techniques and provides power for the operation of the various electrical components in accordance with the present invention. In accordance with a disclosed embodiment, the battery 1120 fits the timing requirements in terms of use, duration, and charging.

The charging chip 1122 is described below and is also mounted upon the flat mounting base 1143 of the shell 1126. The charging chip 1122 is connected to the battery 1120 and regulates charging of the battery 1120 using known technologies. In accordance with a disclosed embodiment, the charging chip 1122 includes a resistor modified to work with the specific battery 1120. As with the other components of the light system 1116, the charging chip should be selected to optimize the weight and/or balance of the actively tracked football 1102. The base material needs to be structurally strong enough to prevent the pressure of the bladder from damaging the circuits when pressing against the curved layers and likewise protect the layers from damage by the edges of the components.

Ideally, the charging chip 1122 is shaped and dimensioned with a form fitting minimalist design. While the disclosed charging chip 1122 is of a traditional construction, the charging chip 1122 may be constructed such that it is flexible or formed to fit inside the football body 1114 while minimizing the materials and weight.

Figure 9:
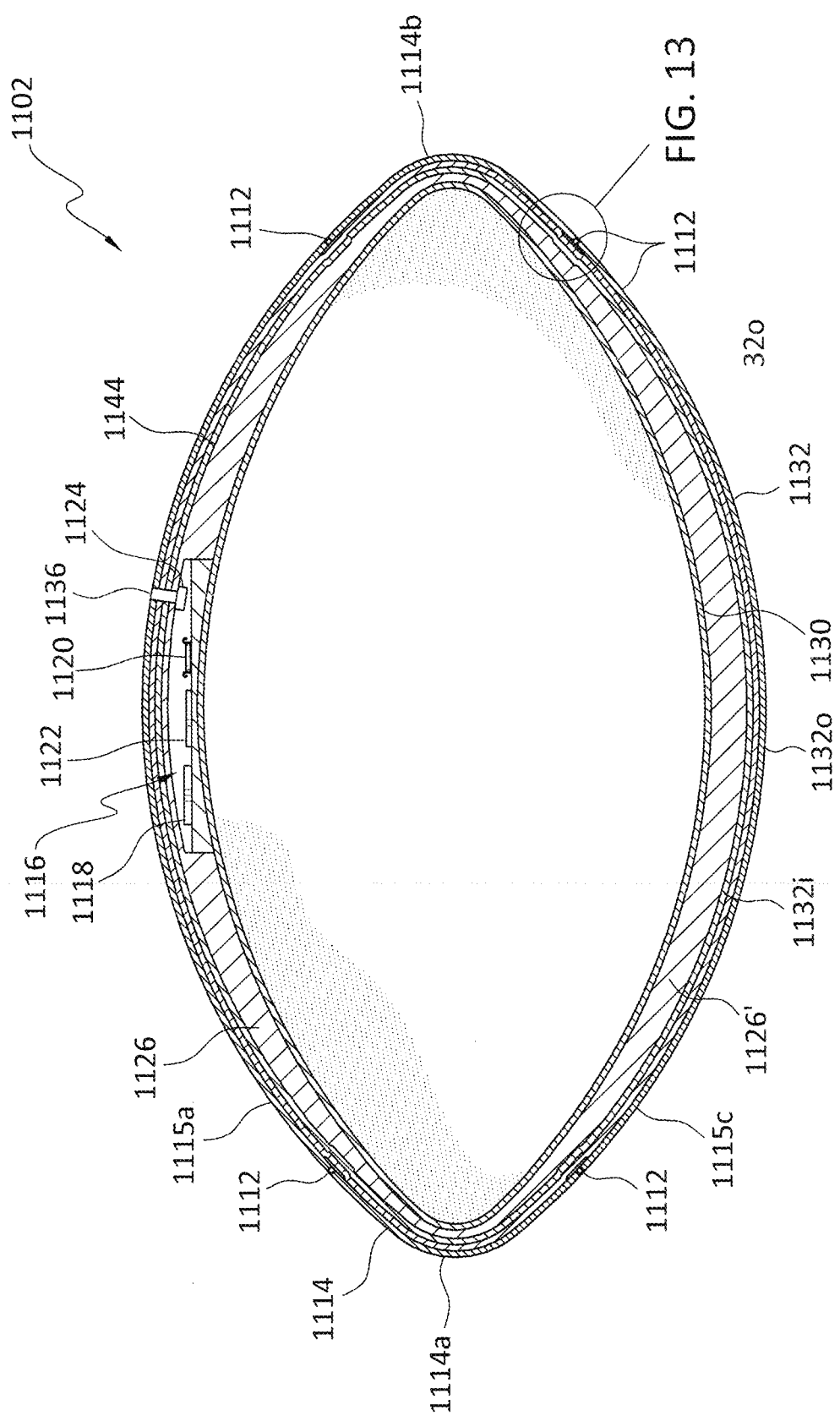
FIG. 9 is a cross sectional view of the football along the line 9-9 in FIG. 8.
Figure 10:
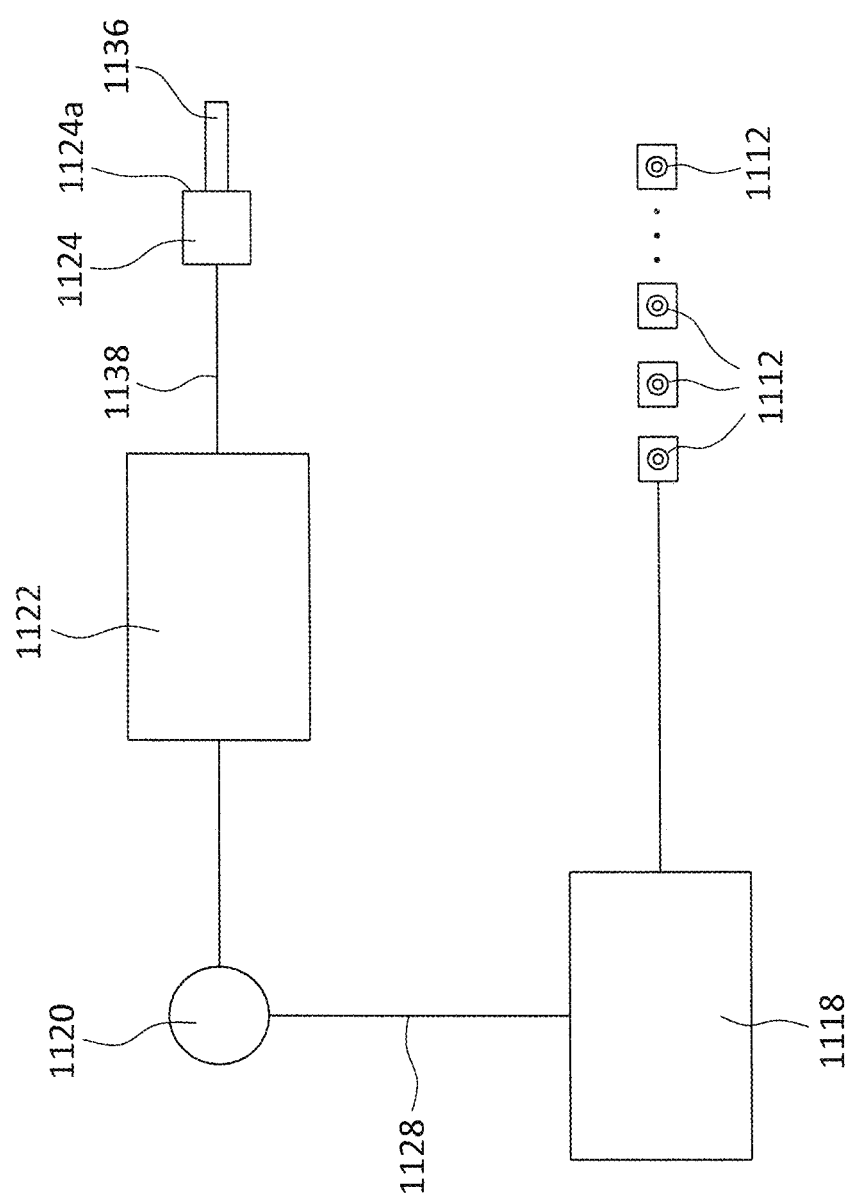
FIG. 10 is a schematic of the light system.

The magnetic charging cable adapter 1124 is shown in FIGS. 9 and 10. The magnetic charging cable adapter 1124 is connected to the charging chip 1122 and includes an input end 1124a shaped and dimensioned for attachment to an external charging cable, and ultimately a power source.

The magnetic charging cable adapter 1124 is similar to those used in conjunction with cell phones. As such, it includes a magnetically active port 1136 and a wire 1138 extending between the port 1136 and the charging chip 1122. As with all of the components of the light system 1116 of the present actively tracked football 1102, weight is a primary consideration as the actively tracked football 1102 should ultimately resemble the shape, weight, and feel of a traditional football so that a user throws and handles the actively tracked football 1102 in a conventional manner without changing anything about how the actively tracked football 1102 is handled and thrown. The port 1136 of the charging cable adapter 1124 is centered and flush on a panel 1115a of the football body 1114 (not the panel that has the valve for the bladder).

Figure 11:
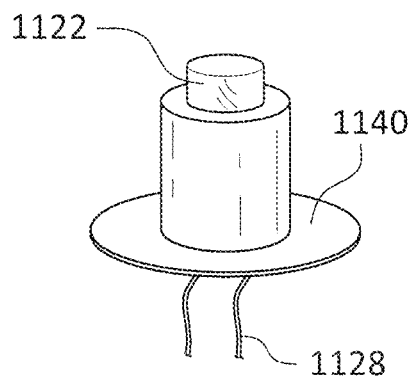
FIG. 11 is a detailed view of an IR LED (Infrared Light Emitting Diode).
Figure 12:
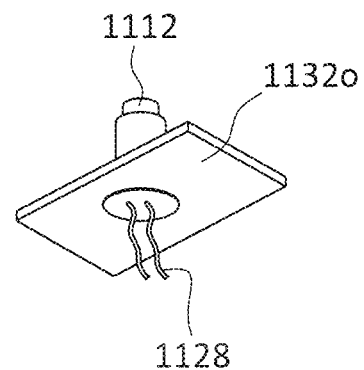
FIG. 12 is a bottom perspective view of the IR LED and tab secured to the skin of the football.
Figure 13:
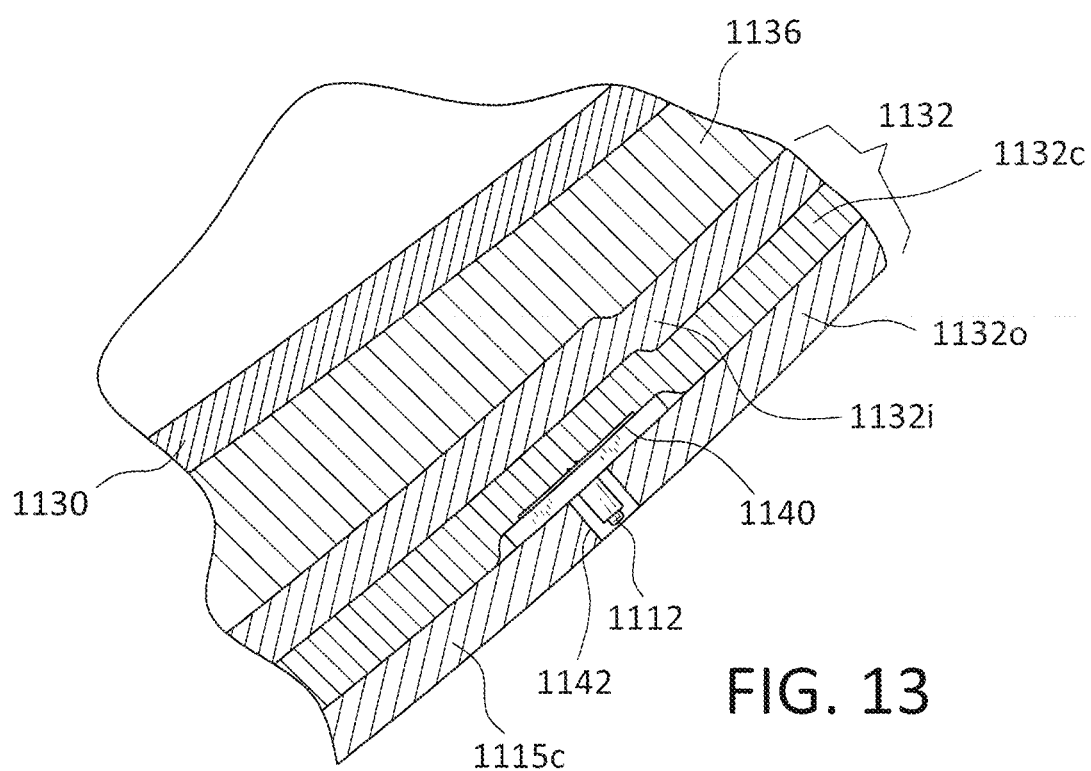
FIG. 13 is a detailed cross-sectional view along the section "FIG. 13" in FIG. 9 showing an IR LED secured to the skin of the football.

IR LEDs 1112 in accordance with a disclosed embodiment are shown in detail with reference to FIGS. 11, 12, and 13. As those skilled in the art appreciate, IR LEDs are light emitting diodes that, rather than emitting visible light, emit light in the invisible IR wavelengths. As such, and as discussed above, the incorporation of the IR LEDs 1112 into the actively tracked football 1102 of the present invention does not materially alter the look or feel of the actively tracked football 1102 when compared to a conventional football.

The IR LEDs 1112 are connected to the control board 1118 via electrical wiring 1128. The IR LEDs 1112 are integrated into or onto the skin 1132 of the football body 1114. In accordance with a disclosed embodiment, the pattern is symmetrical, and the IR LED 1112 are applied two (2) per panel 1115a-d, each being 1.5-2 inches from the respective tips 1114a, 1114b of the football body 1114 and centered laterally on the panels 1115a-d.

There are a total of 8 IR LEDs 1112 integrated into the football body 1114. More IR LEDs 1112 may be used, but it is appreciated that while the increase in the number of IR LEDs 1112 would increase accuracy, the increase in the number of IR LEDs 1112 would also likely result in weight and balance issues and would necessitate a more robust control board. The cameras used in conjunction with the motion tracking system require a minimum of 3-4 visible LEDs. As such, and accounting for ball spin, 8 IR LEDs 1112 are required to maintain a visible set of 4.

In accordance with a disclosed embodiment, the IR LEDs 1112 are mounted individually on small tabs 1140 of flexible circuit material (for example, PYRALUX® Copper Kapton Laminate which is a coated and laminated flexible composite for use in printed circuitry). FIG. 12 shows IR LEDs 1112 soldered to a copper pattern etched from the small tabs 1140 of the PYRALUX® flexible circuit material.

The tabs 1140 are as wide as the IR LEDs 1112 and are designed to be inserted through LED holes 1142 in the skin 1132 of the football body 1114 for placement of the IR LEDs 1112 where the tabs 1140 can open and serve as anchoring tabs to retain the IR LEDs 1112 in place; much like some known drywall anchors. In accordance with a disclosed embodiment, the LEDs are 0.8 mm Height Flat Top Infrared LED HIR19-21C/L11/TR8, manufactured by EVERLIGHT. Generally, these LEDs are 0.8 millimeters in width, 1.6 millimeters in length, 0.8 millimeters in height also, within a variance of plus/minus 0.2 millimeters for height and length. As to the tabs, they are based on the pad dimensions with additional traces and pads to allow for wiring. The tabs should be small enough to fit the hole but long enough to retain themselves. They are as wide as the LED is long, 1.6 mm, and approximately 1-centimeter length.

The tabs 1140 have minimal copper tracing but enough to securely solder the IR LEDs 1112 in place on the respective tabs 1140. The wiring 1128 connecting the tabs 1140 and the IR LEDs 1112 to the control board 1118 is attached and either twisted around the bottom of the tab 1140 or sent through holes in the tab 1140 so that it is on the underside of the tab 1140. The wire is then sewn through the layers of the skin 1132 of the deflated football body 1114.

In practice, small holes are drilled through the outer layer 1132o (of three layers) of the skin 1132. The IR LEDs 1112 are soldered to tabs 1140 of PYRALUX®. A needle is strung on a piece of wire and the ends of that wire are soldered to the ends of the tab 1140. The needle is sent through an LED hole 1142 and the inner layers of the deflated football body 1114. The tab 1140 is then folded and fed into the LED hole 1142 where it unfolds seating the IR LEDs 1112 in the desired position between the outer layer 1132o and the central layer 1132c of the skin 1132. The wire is then cut in the middle and the needle is removed; this is repeated for all IR LEDs 1112. IR LED 1112 testing for polarity is done when the wire is attached to connectors to work with the OptiTrack™ controller board 1118 (4 LEDs per connector) and attached, through the shell wire holes, to the controller board 1118. All wires are worked on through the open lace holes with the bladder 1130 in place but deflated.

Figure 8:
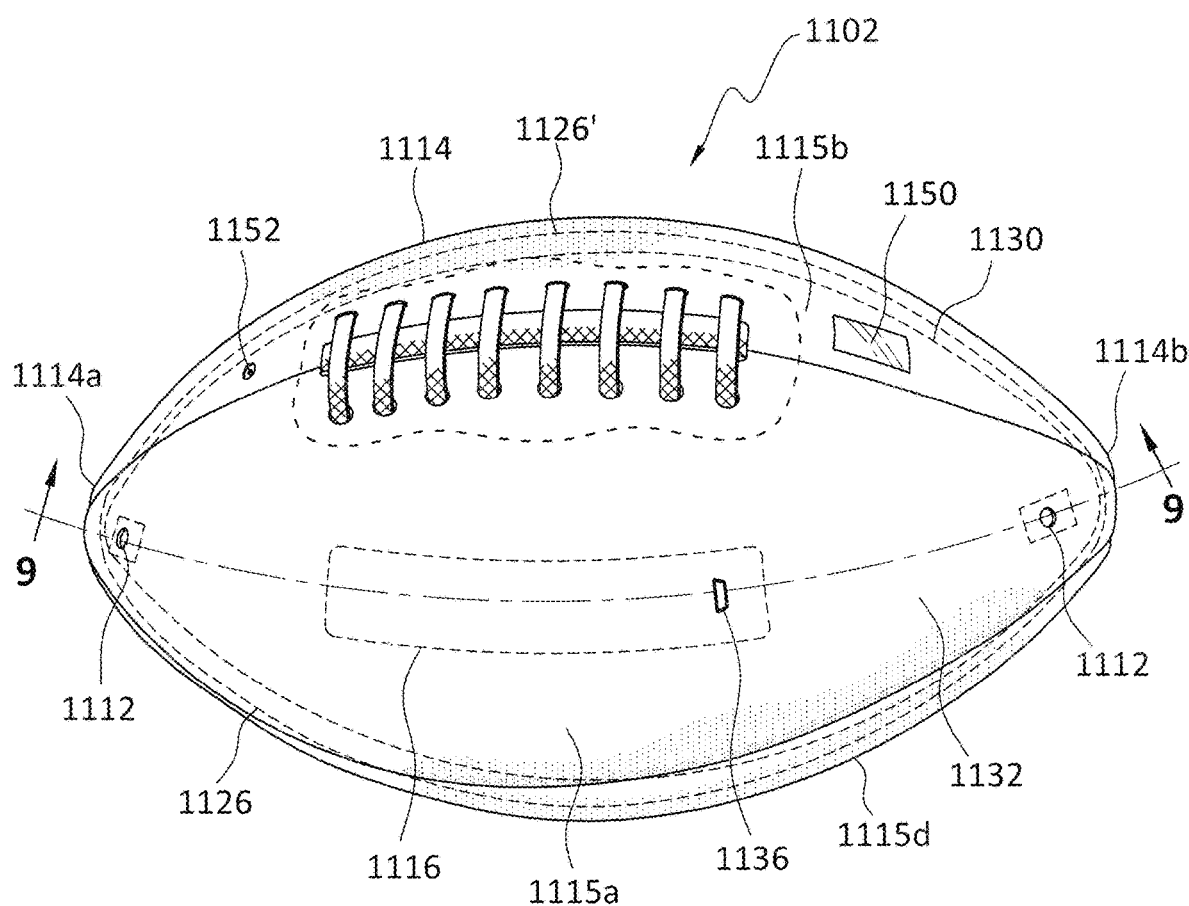
FIG. 8 is a front elevation view of a football in accordance with the present invention.

Referring to FIGS. 8 and 10, the flexible shell 1126 is a turtle shell like structure made from a semi-flexible material. The shell 1126 has flex that allows it to expand/contact with the bladder 1130 of the football body 1114. In accordance with a disclosed embodiment, the shell 1126 is a 3D printed thermoplastic polyurethane (TPU). The shell 1126 is roughly aligned to the inner shape of the football body 1114 at full inflation. As briefly discussed above, the shell 1126 also has a flat mounting base 1143 formed therein for the electrical components it houses (infrared LED control board 1118, battery 1120, charging chip 1122, and wiring 1128). This flat mounting base 1143 pushes into the shell 1126 as the football body 1114 is inflated allowing the outer surface 1144 of the shell 1126 to expand to meet the football body 1114 and preventing empty space in the football body 1114 as well as flexing to stimulate the football body's natural flex. For the sake of symmetry, a secondary shell 1126' is also provided. The secondary shell 1126' is substantially identical to the shell 1126, but it does not include a mounting base because all of the electrical components are maintained on the flat mounting base 1143 of the shell 1126.

The football body 1114 also includes indicator light(s) 1150 providing the user with information regarding the various ball statuses. In accordance with a disclosed embodiment, the indicator light 1150 is a multicolored LED providing status information such as, but not limited to, On, Connecting, Connected, Charging, Battery Low/Med/High. In accordance with a disclosed embodiment the indicator light 1150 is placed near the laces where it can be found easily but does not interfere with the use of the actively tracked football 1102. The football body 1114 further includes an on/off switch 1152 and its placement is similar to that of the indicator light(s) 1150. The on/off switch 1152 is preferably a flush mount switch (such as a reset button style that requires a pen or paperclip to press).

Figure 3:
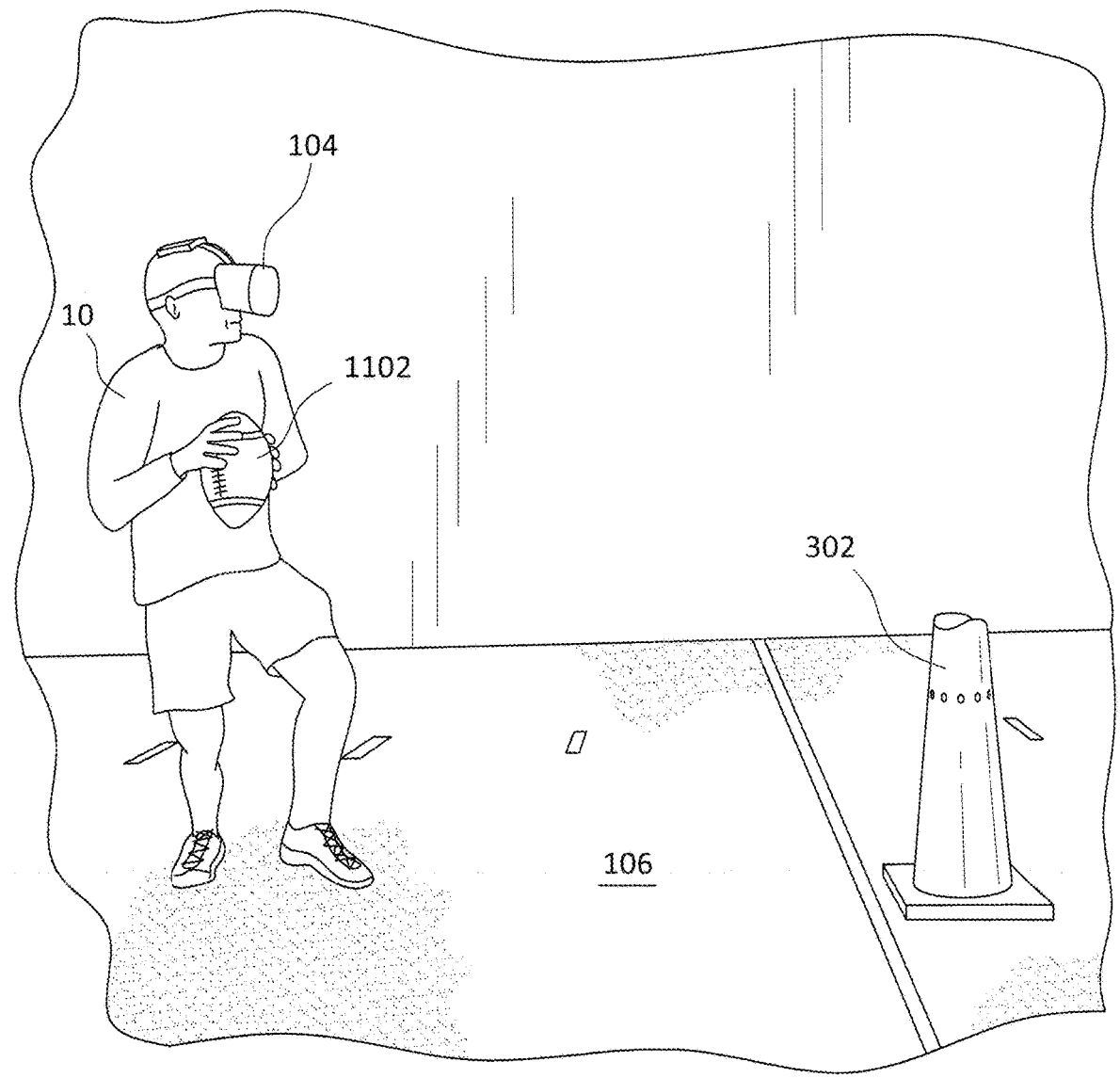
FIG. 3 shows the quarterback in the practice facility starting a play. This shows the headset, ball holding device, quarterback, and practice field.
Figure 4:
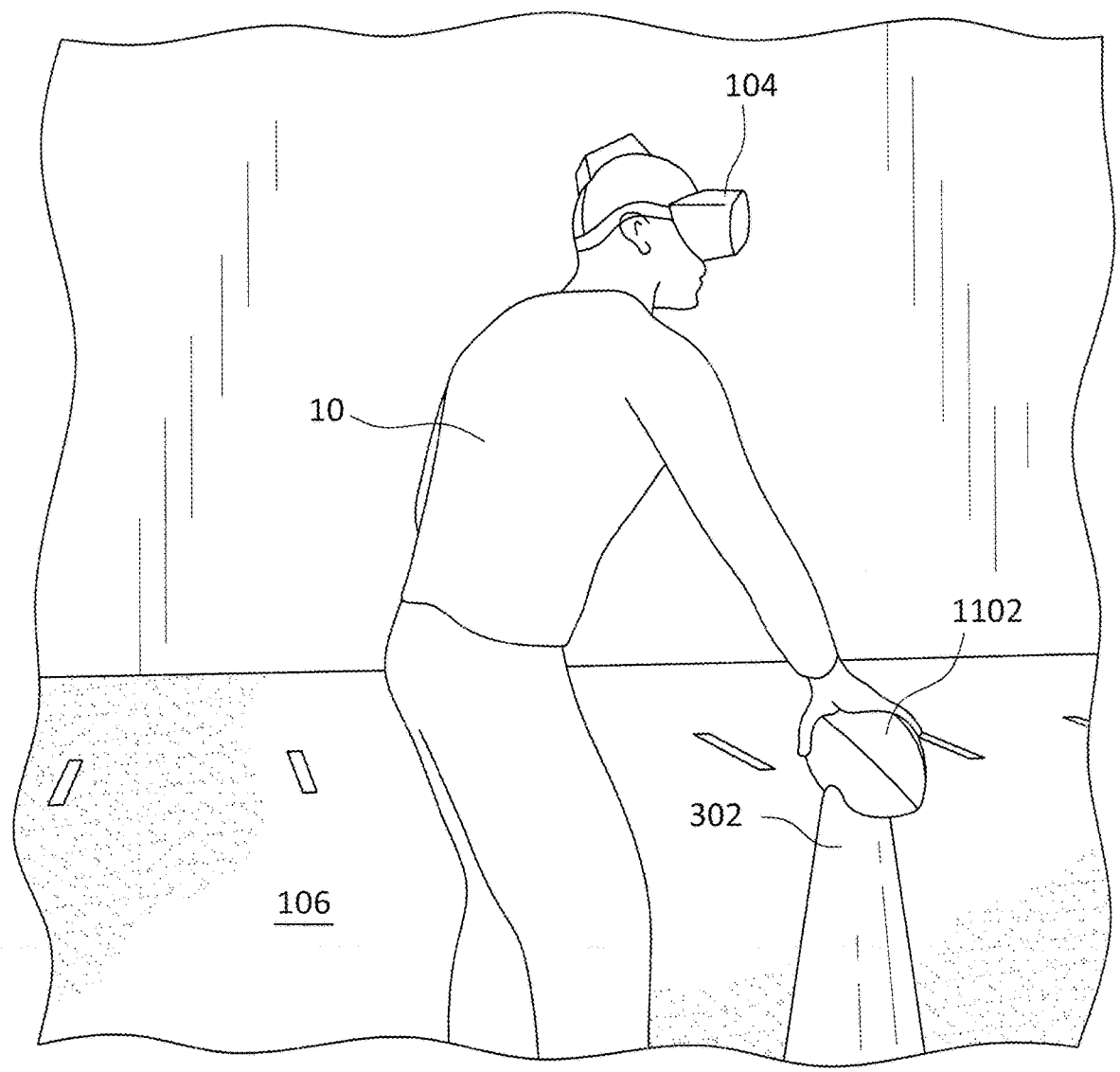
FIG. 4 is the same as FIG. 3, but the ball is still in the cradle of the ball holding device.
Figure 5:
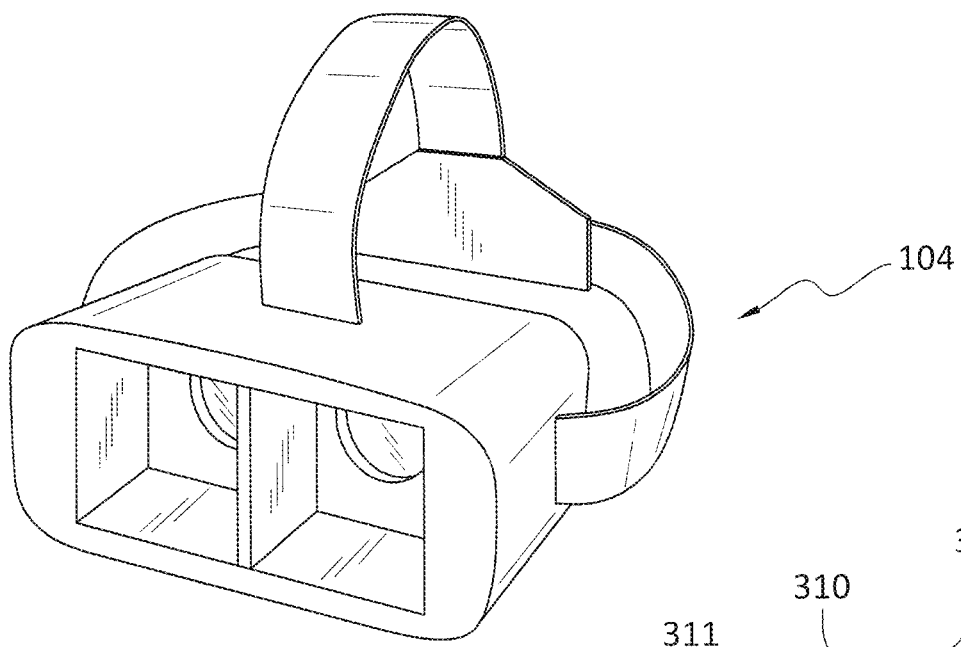
FIG. 5 is a perspective view of a headset.

As to the ball holding device 1302 (briefly discussed above) that would be used in a system where the football 1102 is tracked rather than the ball holding device (see FIG. 14), it is substantially as described above with reference to FIGS. 3, 4, and 6 (and similar reference numerals are used for similar structure), but does not include structure allowing for location identification by the motion capture tracking system 1400. Rather, it includes a support for the football 1102 and a switch 1315 that signals the motion capture tracking system 1400 that the football 1102 is positioned on the ball holding device 1302 and is ready for identification as to the starting location of the football 1102.

The ball holding device 1302 desirably supports the football 1102 even when a user is not nearby to hold the football 1102 on the ball holding device 1302. With reference to FIG. 14, the ball holding device 1302 includes a charging module 1312 and conductive elements 1314 to provide a power source for the football 1102, VR headset or other required equipment. In this way, the ball holding device 1302 is connected via wires to a power source.

Finally, the ball holding device 1302 may have cables connecting to a computer or other processing machine. This connection may also be wireless and utilize Wi-Fi, Bluetooth, or other communication methods to transmit data.

As with the prior embodiment, an OptiTrack™ motion capture tracking system 1400 is used and the specifications for the cameras of the OptiTrack™ motion capture tracking system 1400 are implemented. As discussed above, the football 1102 has features allowing for immediate tracking thereof, for example, IR LEDs that may be identified by the motion capture tracking system 400.

As a result of the motion capture tracking system 1400 identifying the starting location of the football 1102, the ball holding device 1302 could then be repositioned where desired. This repositioning automatically causes the software to redraw the field based on the new perceived location. This allows for new plays and the optimal use of physical practice field space within the training or entertainment venue.

As with the prior embodiment, this geospatial creation is accomplished with various calculations and formulas—including algorithms to maximize beneficial effects in the simulation. In particular, and as discussed above, once a play has commenced, the virtual location of the player is always started relative to that of the actively tracked football 1102. The offset of the physical location of the actively tracked football 1102 at the start of the play serves as a fiduciary location to provide the necessary motion tracking offsets such that virtual translation of motion occurs in a meaningful way. By allowing the user to manually position the actively tracked football 1102 before starting a play, the user can optimize the use of the physical area of the motion capture equipment without having to recalibrate or reset the origin for motion tracking. This also provides an intuitive method for the user to adjust the simulation's origin for motion tracking of the player. The software may also employ machine learning techniques to create AI-inspired scenarios, histories, and the like.

The football 1102 works seamlessly in conjunction with the cameras, software, VR headset, server, and other equipment. It is also anticipated that multiple ball holding devices might be utilized as a way to provide complex simulations or other training options. The ball holding device 1302 locations would be tracked, managed, and recorded in the proposed system.

Those skilled in the art will appreciate that the various illustrative logical blocks, modules, circuits, and algorithm steps described in connection with the embodiments disclosed herein may be implemented as electronic hardware, computer software running on a specific purpose machine that is programmed to carry out the operations described in this application, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall tracking and management system. Skilled artisans may implement the described functionality in varying ways for each particular application, but such implementation decisions should not be interpreted as causing a departure from the scope of the exemplary embodiments.

The various illustrative logical blocks, modules, and circuits described in connection with the embodiments disclosed herein, may be implemented or performed with a general or specific purpose processor, or with hardware that carries out these functions, e.g., a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine.

The processor can be part of a computer system that also has an internal bus connecting to cards or other hardware, running based on a system BIOS or equivalent that contains startup and boot software, system memory which provides temporary storage for an operating system, drivers for the hardware and for application programs, disk interface which provides an interface between internal storage device(s) and the other hardware, an external peripheral controller which interfaces to external devices such as a backup storage device, and a network that connects to a hard-wired network cable such as Ethernet or may be a wireless connection such as a RF link running under a wireless protocol such as 802.11.

The computer system can also have a user interface port that communicates with a user interface, which receives commands entered by a user, and a video output that produces its output via any kind of video output format, e.g., VGA, DVI, HDMI, display port. This may include laptop or desktop computers, and may also include portable computers, including cell phones, smartphones, tablets such as the IPAD™ and Android platform tablet, and all other kinds of computers and computing platforms.

A processor may also be implemented as a combination of computing devices, e.g., a combination of a DSP and a microprocessor, a plurality of microprocessors, one or more microprocessors in conjunction with a DSP core, or any other such configuration. These devices may also be used to select values for devices as described herein.

The steps of a method or algorithm described in connection with the embodiments disclosed herein may be embodied directly in hardware, in a software module executed by a processor, using cloud computing, or in combinations, using tangible computer programming. A software module may reside in Random Access Memory (RAM), flash memory, Read Only Memory (ROM), Electrically Programmable ROM (EPROM), Electrically Erasable Programmable ROM (EEPROM), registers, hard disk, a removable disk, a CD-ROM, or any other form of tangible storage medium that stores tangible, non-transitory computer-based instructions. An exemplary storage medium is coupled to the processor such that the processor can read information from, and write information to, the storage medium. In the alternative, the storage medium may be integral to the processor. The processor and the storage medium may reside in reconfigurable logic of any type.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-Ray disc where disks usually reproduce data magnetically, while discs reproduce data optically with lasers. Combinations of the above should also be included within the scope of computer-readable media. The computer readable media can be an article comprising a machine-readable non-transitory tangible medium embodying information indicative of instructions that when performed by one or more machines result in computer implemented operations comprising the actions described throughout this specification.

Operations as described herein can be carried out on or over a website. The website can be operated on a server computer, operated locally, e.g., by being downloaded to the client computer, or operated via a server farm. The website can be accessed over a mobile phone or a PDA, or on any other client. The website can use HTML code in any form, e.g., MHTML, or XML, and via any form such as cascading style sheets ("CSS") or other.

The computers described herein may be any kind of computer, either general purpose, or some specific purpose computer such as a workstation. The programs may be written in C, or Java, Brew, or any other programming language. The programs may be resident on a storage medium, e.g., magnetic or optical, e.g., the computer hard drive, a removable disk or media such as a memory stick or SD media, or other removable medium. The programs may also be run over a network, for example, with a server or other machine sending signals to the local machine, which allows the local machine to carry out the operations described herein.

While the preferred embodiments have been shown and described, it will be understood that there is no intent to limit the invention by such disclosure, but rather, is intended to cover all modifications and alternate constructions falling within the spirit and scope of the invention.

The invention claimed is:

1. A system for simulating sports, comprising:
a motion capture tracking system linked to a computer for monitoring movement of a ball, wherein the motion capture tracking system includes a plurality of IR (Infrared) motion tracking cameras;
a head mounted display device displaying animations including respective team and opponent team pre-play alignments; and
a selectively moveable ball holding device having a predefined geospatial location on a physical practice field that is monitored and identified by the motion capture tracking system that is linked to the computer, the ball holding device has tracking elements allowing for immediate tracking thereof by the motion capture tracking system, wherein the animations are registered to the physical practice field and are based upon positioning of the ball holding device on the physical practice field;
wherein, upon repositioning of the ball holding device, the motion capture tracking system redraws an animated field based on a new perceived location.

2. The system for simulating sports according to claim 1, wherein the tracking elements of the ball holding device are IR LEDs that may be identified by the motion capture tracking system.

3. The system for simulating sports according to claim 1, wherein the ball holding device includes a securing component to securely hold the ball in place on the ball holding device.

4. The system for simulating sports according to claim 3, wherein the ball is an actively tracked ball.

5. The system for simulating sports according to claim 4, wherein the ball comprises a ball body and light system.

6. The system for simulating sports according to claim 5, wherein the light system includes an infrared LED control board, a battery, a charging chip, a magnetic charging cable adapter, a set of IR LEDs, and wiring.

7. The system for simulating sports according to claim 6, wherein the IR LEDs are integrated into the ball body.

8. The system for simulating sports according to claim 4, wherein the ball holding device also includes a charging module and conductive elements to provide a power source for a football.

9. The system for simulating sports according to claim 1, wherein the ball is an actively tracked ball.

10. The system for simulating sports according to claim 9, wherein the ball comprises a ball body and light system.

11. The system for simulating sports according to claim 10, wherein the light system includes an infrared LED control board, a battery, a charging chip, a magnetic charging cable adapter, a set of IR LEDs, and wiring.

12. The system for simulating sports according to claim 11, wherein the IR LEDs are integrated into the ball body.

* * * * *